US011652942B2

(12) United States Patent
Hirao

(10) Patent No.: US 11,652,942 B2
(45) Date of Patent: May 16, 2023

(54) IMAGE PROCESSING APPARATUS, METHOD FOR CONTROLLING THE SAME, AND STORAGE MEDIUM

(71) Applicant: CANON KABUSHIKI KAISHA, Tokyo (JP)

(72) Inventor: Toyomi Hirao, Chiba (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 17/472,466

(22) Filed: Sep. 10, 2021

(65) Prior Publication Data

US 2022/0086298 A1 Mar. 17, 2022

(30) Foreign Application Priority Data

Sep. 14, 2020 (JP) ............................. JP2020-153843

(51) Int. Cl.

*H04N 1/00* (2006.01)
*B65H 7/20* (2006.01)
*B65H 1/14* (2006.01)

(52) U.S. Cl.

CPC ........... *H04N 1/00938* (2013.01); *B65H 1/14* (2013.01); *B65H 7/20* (2013.01); *H04N 1/00694* (2013.01);

(Continued)

(58) Field of Classification Search

CPC .................. B65H 1/14; B65H 2301/13; B65H 2511/514; B65H 7/20; B65H 1/04; B65H 2301/36212; B65H 2402/441; B65H 2403/411; B65H 2405/1117; B65H 2405/3322; B65H 2511/12; B65H 2511/20; B65H 2513/40; B65H 2801/39; B65H 3/0684; B65H 3/34; B65H 3/5261; B65H 3/56; B65H 31/02; B65H 2301/34; B65H 2301/4212; B65H 2402/60; B65H 2404/152; B65H 2405/1111; B65H 2405/1114; B65H 2405/11151; B65H 2405/1124; B65H 2405/332;

(Continued)

(56) References Cited

U.S. PATENT DOCUMENTS 5,624,107 A * 4/1997 Deguchi ................ G03G 15/60 271/145
6,333,797 B1 * 12/2001 Katsuta .............. H04N 1/00567 399/396

(Continued)

FOREIGN PATENT DOCUMENTS

| | | | |
|---|---|---|---|
| JP | 2001350225 | A | 12/2001 |
| JP | 2005263452 | A | 9/2005 |
| JP | 2016-210559 | A | 12/2016 |

*Primary Examiner* — Negussie Worku

(74) *Attorney, Agent, or Firm* — Canon U.S.A., Inc. I.P. Division

(57) ABSTRACT

There is provided a mechanism for determining whether to perform processing of lifting up a document tray upon detection of a document depending on an active application. A method for controlling an image processing apparatus includes lifting up a document tray upon placement of a document on the document tray, conveying the document placed on the document tray lifted up in the lifting, reading the document conveyed in the conveying, and registering, for an application, whether to lift up the document tray upon the placement of the document on the document tray.

11 Claims, 17 Drawing Sheets

200

100

(52) U.S. Cl.
CPC ..... *H04N 1/00782* (2013.01); *B65H 2301/13* (2013.01); *B65H 2511/514* (2013.01)

(58) Field of Classification Search
CPC .......... B65H 2511/51; B65H 2601/321; B65H 2601/325; B65H 2801/06; B65H 31/24; H04N 1/00602; H04N 1/00572; H04N 1/00578; H04N 1/0058; H04N 1/00567; H04N 1/00694; H04N 1/00782; H04N 1/00938; H04N 1/12; H04N 1/193; H04N 2201/0094; H04N 1/00525; H04N 1/0062; H04N 1/00628; H04N 1/00631; H04N 1/00649; H04N 1/00687; H04N 1/00689; H04N 1/00896; H04N 2201/0081; H04N 2201/0082; H04N 1/00007; H04N 1/00037; H04N 1/00058; H04N 1/00082; H04N 1/00204; H04N 1/0035; H04N 1/00352; H04N 1/00384; H04N 1/00397; H04N 1/00437; H04N 1/00477; H04N 1/0049; H04N 1/00551; H04N 1/00588; H04N 1/00591; H04N 1/00612; H04N 1/00633; H04N 1/00639; H04N 1/00663; H04N 1/00705; H04N 1/00734; H04N 1/00885; H04N 1/00888; H04N 1/00891; H04N 1/00915; H04N 1/00957; H04N 1/02815; H04N 1/0282; H04N 1/031; H04N 1/0315; H04N 1/0318; H04N 1/0464; H04N 1/1017; H04N 1/2307; H04N 1/233; H04N 1/2338; H04N 1/2369; H04N 1/2392; H04N 1/32486; H04N 1/32502; H04N 1/32512; H04N 1/32529; H04N 1/32561; H04N 1/333; H04N 1/40062; H04N 1/4074; H04N 1/484; H04N 1/58; H04N 1/6027; H04N 2201/0086; H04N 2201/03112; H04N 2201/03145; H04N 2201/3288; H04N 2201/33314; G03G 15/602; G03G 15/00; G03G 15/234; G03G 15/60; G03G 15/605; G03G 15/607; G03G 15/6511; G03G 21/10; G03G 21/1652; G03G 2215/00316; G03G 2215/00341; G03G 2221/166; G03G 15/0435; G03G 15/0806; G03G 15/221; G03G 15/32; G03G 15/502; G03G 15/6538; G03G 15/6564; G03G 15/6567; G03G 2215/00928
USPC ........................................................ 271/3.15
See application file for complete search history.

(56) References Cited

U.S. PATENT DOCUMENTS

| | | | | | |
|---|---|---|---|---|---|
| 11,150,585 | B2 * | 10/2021 | Yoshimura | H04N 1/00793 | |
| 2007/0071487 | A1 * | 3/2007 | Makiura | G03G 21/10 | 399/350 |
| 2007/0257422 | A1 * | 11/2007 | Suzuki | H04N 1/00649 | 271/225 |
| 2010/0148420 | A1 * | 6/2010 | Hamano | B65H 3/0607 | 271/3.15 |
| 2015/0242719 | A1 * | 8/2015 | Kashiwagi | H04N 1/2166 | 358/1.12 |
| 2017/0066610 | A1 * | 3/2017 | Kai | G03G 15/6514 | |
| 2018/0255194 | A1 * | 9/2018 | Osada | H04N 1/00745 | |
| 2019/0049890 | A1 * | 2/2019 | Sugiura | G03G 15/2064 | |
| 2019/0320079 | A1 * | 10/2019 | Kurimoto | H04N 1/00604 | |
| 2020/0189865 | A1 * | 6/2020 | Yamaguchi | B65H 1/14 | |
| 2021/0107754 | A1 * | 4/2021 | Fujii | B65H 3/06 | |
| 2021/0371220 | A1 * | 12/2021 | Suwa | B65H 7/02 | |
| 2022/0021777 | A1 * | 1/2022 | Totsuka | B65H 3/0684 | |
| 2022/0055851 | A1 * | 2/2022 | Ito | B65H 1/14 | |

* cited by examiner

1000
S
30
9
100
1
10
101
17
2
21
11
12
3
16
15
13
204b
203b
201
54
8
53
110
200
4
7
103a
104a
108
204c
202
208
52
6
105
104c
204a
203a
210
14
5
51
102
103b
104b

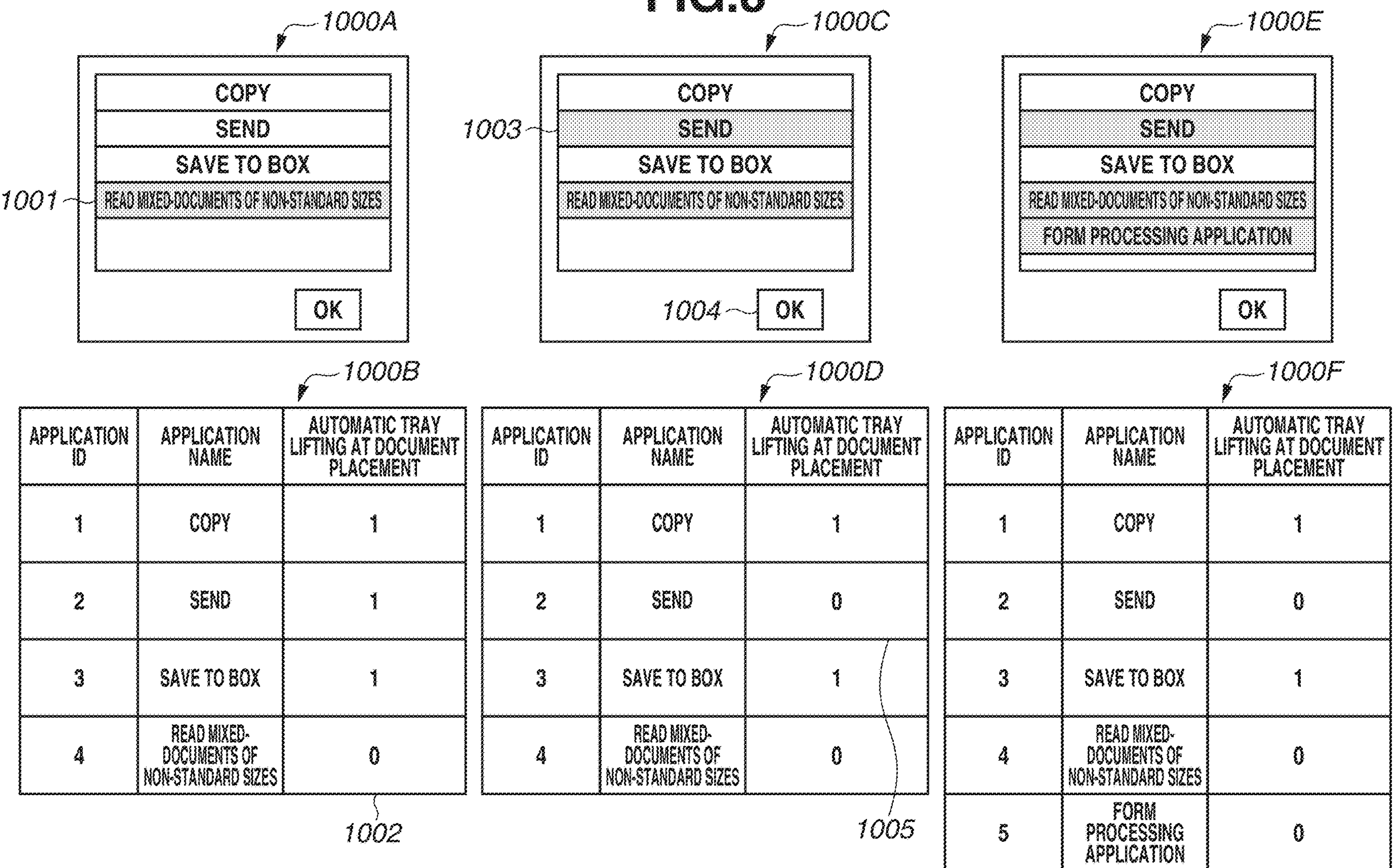

| APPLICATION ID | APPLICATION NAME | AUTOMATIC TRAY LIFTING AT DOCUMENT PLACEMENT |
|---|---|---|
| 1 | COPY | 1 |
| 2 | SEND | 1 |
| 3 | SAVE TO BOX | 1 |
| 4 | READ MIXED-DOCUMENTS OF NON-STANDARD SIZES | 0 |

| APPLICATION ID | APPLICATION NAME | AUTOMATIC TRAY LIFTING AT DOCUMENT PLACEMENT |
|---|---|---|
| 1 | COPY | 1 |
| 2 | SEND | 0 |
| 3 | SAVE TO BOX | 1 |
| 4 | READ MIXED-DOCUMENTS OF NON-STANDARD SIZES | 0 |

| APPLICATION ID | APPLICATION NAME | AUTOMATIC TRAY LIFTING AT DOCUMENT PLACEMENT |
|---|---|---|
| 1 | COPY | 1 |
| 2 | SEND | 0 |
| 3 | SAVE TO BOX | 1 |
| 4 | READ MIXED-DOCUMENTS OF NON-STANDARD SIZES | 0 |
| 5 | FORM PROCESSING APPLICATION | 0 |

1200A
COPY
STANDARD SIZE
MIXED-DOCUMENTS OF NON-STANDARD SIZES
SEND
SAVE TO BOX
READ MIXED-DOCUMENTS OF NON-STANDARD SIZES
OK
1200B
APPLICATION ID
APPLICATION NAME
READ TYPE
1 COPY 0
2 SEND 0
3 SAVE TO BOX 0
4 READ MIXED-DOCUMENTS OF NON-STANDARD SIZES 1
1200C
1201
1202
1200D
1 COPY 0
2 SEND 1
3 SAVE TO BOX 0
4 READ MIXED-DOCUMENTS OF NON-STANDARD SIZES 1

IMAGE PROCESSING APPARATUS, METHOD FOR CONTROLLING THE SAME, AND STORAGE MEDIUM

BACKGROUND OF THE INVENTION

Field of the Invention

The present invention relates to an image processing apparatus, a method for controlling the image processing apparatus, and a storage medium.

Description of the Related Art

A conventional auto document feeder (hereinafter referred to as an ADF) is known that conveys documents placed on a document tray sheet by sheet and reads the conveyed documents to generate image data.

In a known image reading apparatus, when a document detection sensor for detecting a document set on the document tray detects presence of the document, the document tray is lifted up, and the upper surface of the document set on the document tray is brought into contact with a feed roller (Japanese Patent Application Laid-Open No. 2005-263452).

A mixed-documents reading mode is known that conveys documents of a plurality of different sizes set on a document tray sheet by sheet, determines the size of each of the conveyed documents, and reads the document based on the determined size (Japanese Patent Application Laid-Open No. 2001-350225).

When documents of a standard size are read, guide plates on the document tray are abutted on the documents as illustrated in FIG. 15A to prevent the documents from being conveyed askew, and the documents are conveyed sheet by sheet by a feed roller.

However, when a plurality of documents of non-standard sizes is placed on the document tray, even if the guide plates are abutted on lateral sides of a large-sized document, a small-sized document is not brought into contact with the guide plates as illustrated in FIG. 15B. Thus, the small-sized document is not placed at a position of the feed roller, and hence may not be properly fed.

Thus, a user needs to carefully place the small-sized document at the position of the feed roller, as illustrated in FIG. 16A.

If the document is initially placed at a position shifted from the position of the feed roller, as illustrated in FIG. 16B, the user may want to move the document to the position of the feed roller, or reset the documents.

When the document tray is lifted up upon detection of the documents, the upper surface of the document comes into contact with the feed roller as illustrated in FIG. 17. This raises an issue that the user finds it difficult to reset the documents.

On the other hand, when documents of a standard size are read, a time period from when a document read instruction is issued to when the first document is fed can be reduced by lifting up the document tray upon detection of the documents.

SUMMARY OF THE INVENTION

According to an aspect of the present invention, an image processing apparatus includes a document tray, a lifting unit configured to lift up the document tray upon placement of a document on the document tray, a conveyance unit configured to convey the document placed on the document tray lifted up by the lifting unit, a reading unit configured to read the document conveyed by the conveyance unit, and a registration unit configured to register, for an application, whether to lift up the document tray upon the placement of the document on the document tray.

Further features of the present invention will become apparent from the following description of exemplary embodiments with reference to the attached drawings.

BRIEF DESCRIPTION OF THE DRAWINGS

FIG. 8 is a diagram illustrating a screen for setting document tray control for each application according to the first exemplary embodiment.

DESCRIPTION OF THE EMBODIMENTS

Exemplary embodiments of the present invention will be described in detail below with reference to the accompanying drawings. The following exemplary embodiments do not limit the present invention set forth in the appended claims. Not all combinations of features described in the exemplary embodiments are necessarily indispensable to the solutions for the present invention.

An example configuration of a reading apparatus included in an image processing apparatus according to a first exemplary embodiment of the present invention will be described below with reference to the accompanying drawings.

Figure 1:
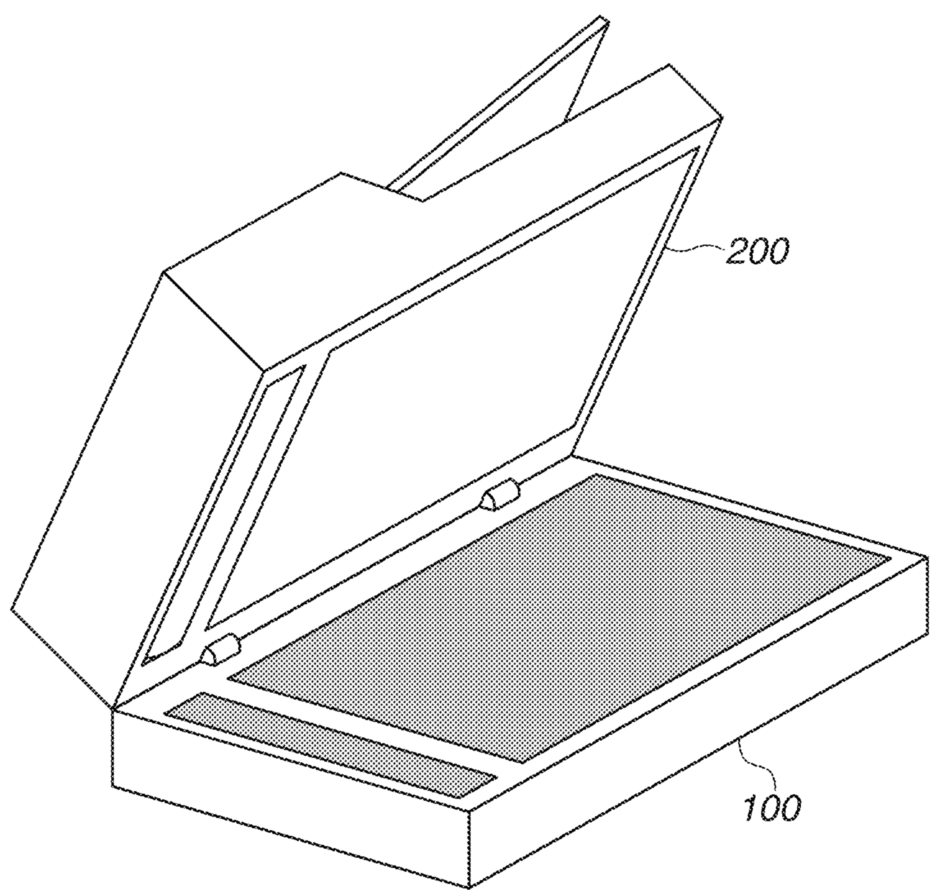
FIG. 1 is a diagram illustrating a reading apparatus according to a first exemplary embodiment.

FIG. 1 is a perspective view illustrating an example of the reading apparatus according to the present exemplary embodiment. The reading apparatus according to the present exemplary embodiment includes a document reading unit 100 that reads a document, and an Auto Document Feeder (hereinafter referred to as an ADF) 200 that conveys the document to the document reading unit 100.

The ADF 200 is connected to the document reading unit 100 to be freely opened and closed with opening/closing hinges on the back side on the upper surface of the document reading unit 100.

When the ADF 200 is closed, a document pressing member, which is attached on the side of the document reading unit 100, of the ADF 200 presses the documents placed on the document reading unit 100.

<Example Configuration of Document Reading Unit 100>

Figure 2:
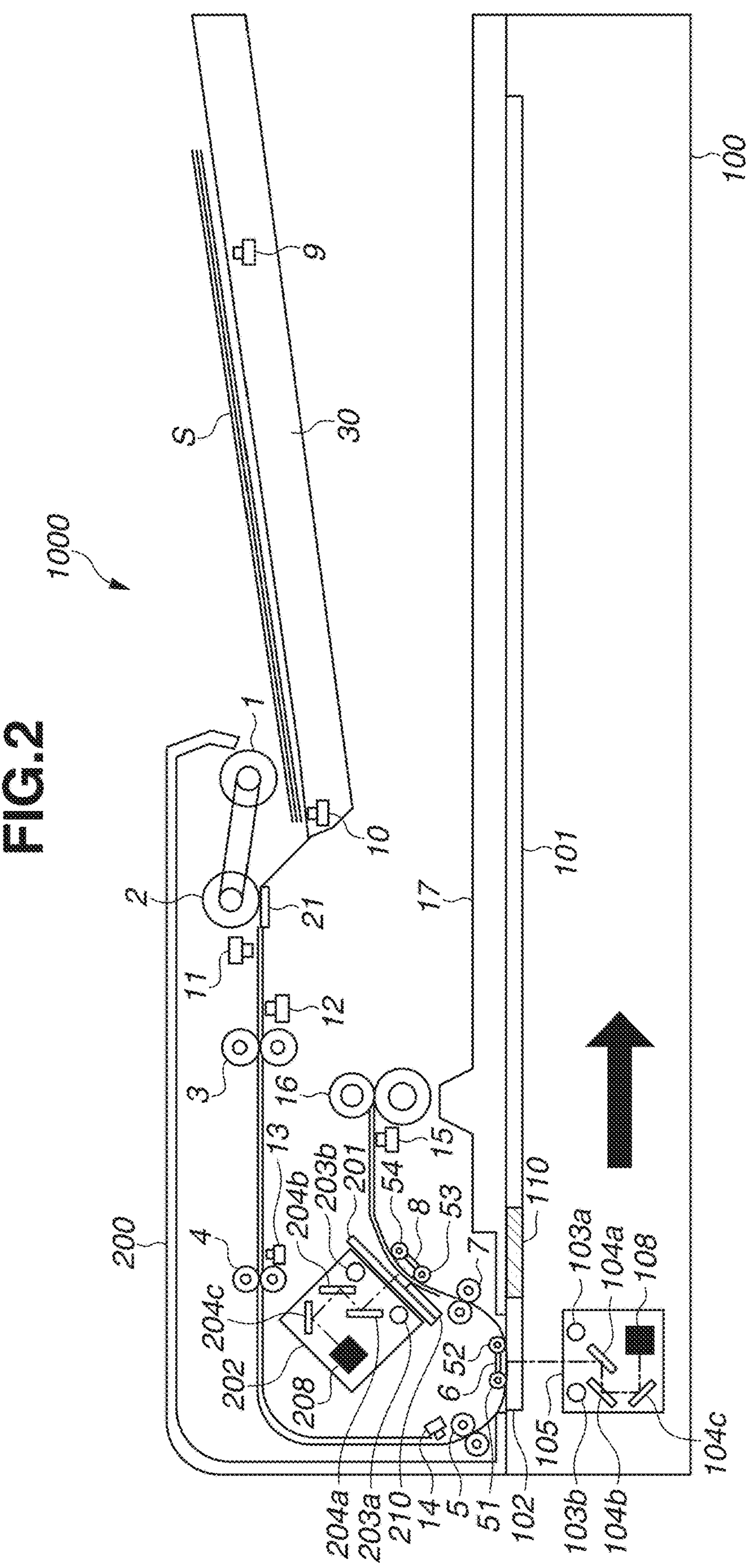
FIG. 2 is a cross-sectional view illustrating the reading apparatus according to the first exemplary embodiment.

The document reading unit 100 will be described below with reference to FIG. 2. FIG. 2 is a cross-sectional view illustrating the ADF 200 according to the present exemplary embodiment.

The document reading unit 100 includes a document positioning glass plate 101, a front surface reading unit 105, an optical motor (not illustrated), and a reading moving guide. When performing document reading control (pressing plate reading control), the document reading unit 100 reads a document placed on the document positioning glass plate 101 while moving the front surface reading unit 105 along the reading moving guide.

In feeding-reading control, the front surface reading unit 105 reads an image of the document having been conveyed to a front surface feeding-reading glass plate 102 by the ADF 200.

The ADF 200 includes a document tray 30 that stacks a document bundle S including at least one document. The ADF 200 also includes a separation pad 21, a separation roller 2, and a feed roller 1 as a separation mechanism. The separation pad 21 prevents the document bundle S from protruding from the document tray 30 and advancing to the downstream side in the document conveyance direction before document feed is started. The document tray 30 includes a document detection sensor 10 that detects the presence of the document, and a document tray size detection sensor 9 that determines the size of the document on the document tray 30.

To enable reliable conveyance of the document placed on the document tray 30 during document conveyance, it is necessary that the feed roller 1 and the document bundle S be brought into contact with each other and that the contact portion be applied with appropriate pressure. To accomplish this, the document tray 30 is lifted up to a predetermined height, and the feed roller 1 is pressed against the surface of the uppermost document of the document bundle S stacked on the document tray 30. In this state, rotating the feed roller 1 enables feeding of the documents sheet by sheet from the uppermost document of the document bundle S. The documents fed by the feed roller 1 are separated by the actions of the separation pad 21 and the separation roller 2, and the uppermost document is conveyed.

The document separated by the separation pad 21 and the separation roller 2 is conveyed to a drawing roller 3 and then further conveyed to a conveyance roller 4 by the drawing roller 3. A conveyance path for conveying the document having passed through the conveyance roller 4 toward the front surface feeding-reading glass plate 102 is formed on the downstream side of the conveyance roller 4. The document having been conveyed to the conveyance path is further conveyed to a front surface reading position by a front surface reading conveyance roller 5 and a front surface reading upstream roller 51.

<<Reading Front Surface>>>

The document having been conveyed to the front surface reading position passes through a gap between the front surface feeding-reading glass plate 102 and a front surface glass facing member 6, and is irradiated with light by front surface light emitting diodes (LEDs) 103*a* and 103*b*. Then, while the reflected light is being bent by a plurality of mirrors 104*a*, 104*b*, and 104*c*, the reflected light is read by a front surface read sensor 108. An image on the front surface of the document is read line by line by such a method.

The document having been read is discharged to a discharge tray 17 by a conveyance roller 7, located between the front surface reading position and a back surface reading position, and a discharge roller 16.

When a plurality of documents is present on the document tray 30, the image processing apparatus repeats processing of feed, separation, and conveyance from the above-described document bundle S, read processing at a front surface feeding-reading position, and discharge processing until the image processing apparatus completes reading of the front surface of the last document and discharges the last document to the discharge tray 17.

<<Two-Sided Reading>>>

Two-sided feeding-reading includes the reading of the front surface of the document in one-sided feeding-reading and the reading of the back surface of the document. Feed, separation, conveyance, and front surface reading of the document is similar to those in the above-described one-sided feeing-reading, and thus redundant descriptions thereof will be omitted.

The document having been conveyed by a front surface reading downstream roller 52 is conveyed to a back surface feeding-reading position by the back surface reading conveyance roller 7 and a back surface reading upstream roller 53. Before the document reaches the back surface feeding-reading position, a movably configured back surface feeding-reading glass plate 201 is moved to a position illustrated in FIG. 2. The back surface of the document passing through a space between the back surface feeding-reading glass plate 201 and the back surface glass facing member 8 is irradiated with light by back surface LEDs 203*a* and 203*b*. While the reflected light is being bent by a plurality of mirrors 204*a*, 204*b*, and 204*c*, an image on the back surface of the document is read by a back surface read sensor 208. The image on the back surface of the document is read for each line by such a method.

The document having been conveyed by a back surface reading downstream roller 54 is conveyed to the discharge tray 17 by the discharge roller 16.

When a plurality of documents is present on the document tray 30, the image processing apparatus repeats processing of feed, separation, and conveyance from the document bundle S, read processing on the front and back surfaces, and discharge processing until the image processing apparatus has completes reading of the front and back surfaces of the last document and discharges the last document to the discharge tray 17.

A charge coupled device (CCD) or a contact image sensor (CIS) may be used for the front surface reading unit 105 and a back surface reading unit 202.

<Descriptions of Block Diagram>

Figure 3:
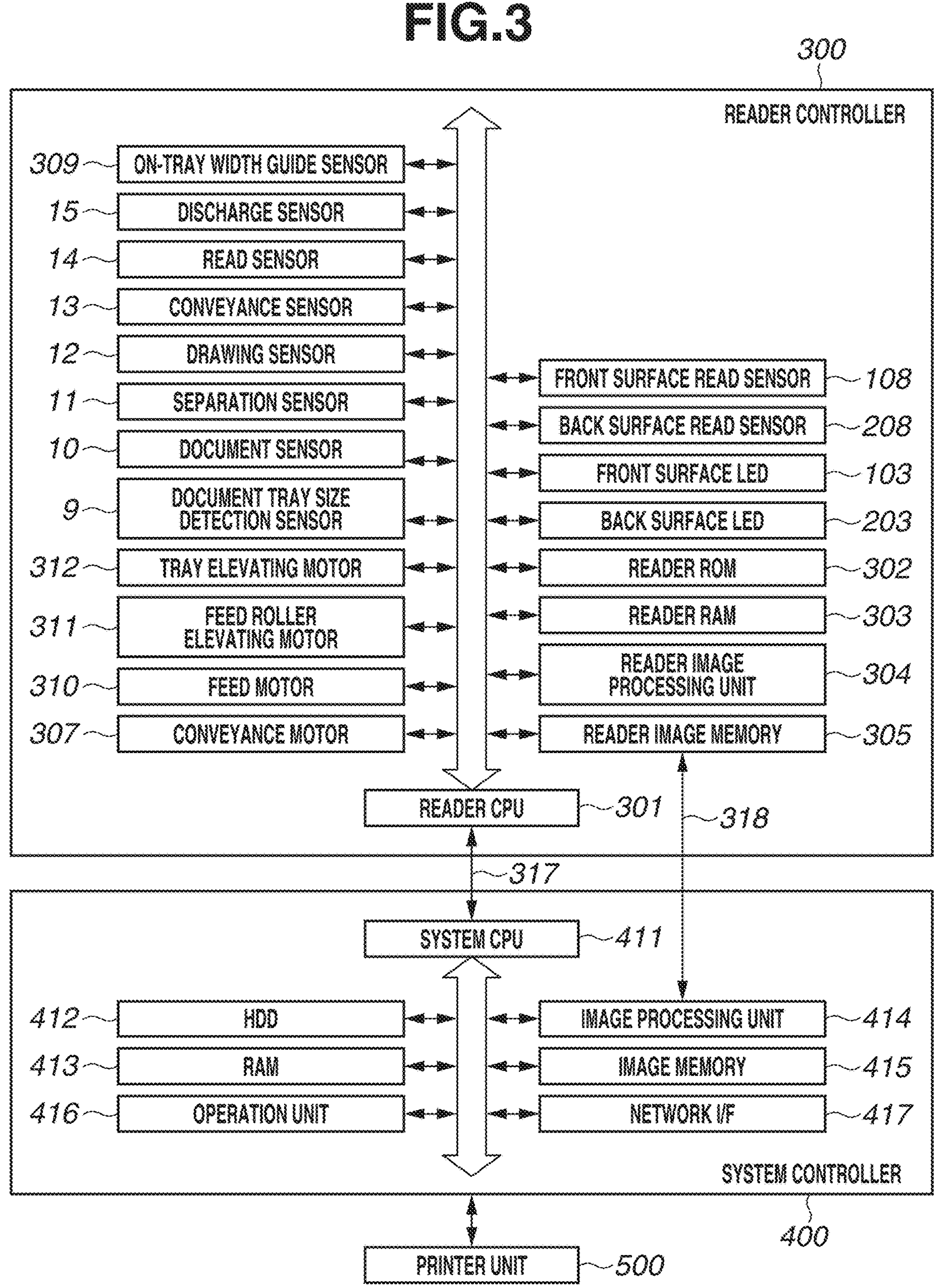
FIG. 3 is a block diagram illustrating a configuration of an image processing apparatus according to the first exemplary embodiment.

FIG. 3 is a block diagram illustrating an example configuration of a reader controller 300 according to the present exemplary embodiment.

The reader controller 300 includes a reader central processing unit (CPU) 301 as a central processing apparatus. The reader controller 300 includes a reader read only memory (ROM) 302 and a reader random access memory (RAM) 303. The reader ROM 302 stores a control program, and the reader RAM 303 stores input data and working data. The reader CPU 301 executes a control program stored in the reader ROM 302 to control the document reading unit 100.

To implement a document conveyance function, the reader CPU 301 controls drive and rotation of a feed motor 310 and a conveyance motor 307 that drive each conveyance roller. When the feed motor 310 is driven, the feed roller 1 and the separation roller 2 connected to the feed motor 310 rotate, and a document is fed. Other rollers such as the drawing roller 3, the conveyance roller 4, the read upstream roller (front surface reading conveyance roller) 5, the read downstream roller (back surface reading conveyance roller) 7, and the discharge roller 16 are directly connected to the conveyance motor 307 and are driven and stopped in association with the rotation of the conveyance motor 307.

The feed motor 310 and the conveyance motor 307 according to the present exemplary embodiment are pulse motors, and the reader CPU 301 controls the number of drive pulses thereof to regulate a rotation amount of each of the motors. Thus, the number of drive pulses can be grasped as a conveyance distance of the document currently being conveyed. The reader CPU 301 counts the number of drive pulses of each of the feed motor 310 and the conveyance motor 307 to measure the conveyance distance of the document. The reader CPU 301 is connected to a system CPU 411 and performs various types of control based on an instruction from the system CPU 411.

The reader controller 300 further includes conveyance system sensors (including a separation sensor 11, a drawing sensor 12, a conveyance sensor 13, a read sensor 14, and a discharge sensor 15 illustrated in FIG. 2) provided at various positions in the conveyance path.

The reader controller 300 further includes the on-tray length sensor (document tray size detection sensor) 9 that detects the length of the document on the document tray 30, and an on-tray width guide sensor 309 that similarly detects the width of the document. The reader controller 300 estimates the size of the document on the document tray 30 by using the above-described on-tray length sensor 9 and on-tray width guide sensor 309.

When the document detection sensor 10 detects the documents set on the document tray 30, the reader CPU 301 operates a feed roller elevating motor 311 to lower the feed roller 1. Then, the reader CPU 301 operates a tray elevating motor 312 to lift up the document tray 30. The reader CPU 301 may operate the feed roller elevating motor 311 to perform only processing for lifting up the document tray 30 without performing processing for lowering the feed roller 1.

The reader CPU 301 stops lifting up the document tray 30 at a position where the lowered feed roller 1 comes into contact with the documents set on the document tray 30.

The reader CPU 301 is connected with the front surface LED 103, the back surface LED 203, the front surface line sensor (front surface read sensor) 108, and the back surface line sensor (back surface read sensor) 208 to implement an image reading function. The reader CPU 301 subjects image data read by the front surface line sensor 108 and the back surface line sensor 208 to various types of image processing by a reader image processing unit 304, and stores the processed image data in a reader image memory 305.

The reader CPU 301 transmits the image data stored in the reader image memory 305 to a system controller 400 via an image data bus 318 in response to an image output request received from the system controller 400 via a command data bus 317.

The reader CPU 301 further transmits a vertical synchronization signal serving as a reference of the starting position of document image data and a horizontal synchronization signal serving as a reference of the starting position of a one-line pixel to the system controller 400 via the image data bus 318.

The system controller 400 includes the system CPU 411, a hard disk drive (HDD) 412, and a RAM 413, and transmits and receives data related to image reading control to and from the reader CPU 301 via the command data bus 317. The image data processed by the reader image processing unit 304 is transferred to an image processing unit 414 in the system controller 400 via the image data bus 318. Then, the image data is subjected to predetermined image processing such as color determination and is stored in an image memory 415. The system controller 400 also includes an operation unit 416, and the system CPU 411 performs a user interface control via the operation unit 416.

In the present exemplary embodiment, an application that reads a document and subjects the read document to form processing is stored as software in the HDD 412. The application is read into the RAM 413 as required, and then executed by the system CPU 411.

An instruction for performing the document reading, an instruction for preliminary operations accompanying the document reading, and a user interface to be displayed on the operation unit 416 are controlled by a system control application executed by the system CPU 411.

<About Mixed-Documents Reading>

A method for reading a plurality of documents of different sizes will be described below.

In a similar manner as the above-described reading method (one-sided and two-sided reading), the reader CPU 301 feeds each of the documents stacked on the document tray 30 sheet by sheet and conveys the document in the conveyance path by using the feed roller 1 and the separation roller 2. At this time, the reader CPU 301 detects the length of the conveyed document by using the separation sensor 11. More specifically, the documents are fed from the document bundle S on the document tray 30 by using the feed roller 1, and the uppermost document is separated and conveyed by using the separation roller 2 and the separation pad 21. The leading edge of the conveyed document is detected by the separation sensor 11, and a signal from the separation sensor 11 is turned on from off. When the document is conveyed and the trailing edge of the document passes through the separation sensor 11, the signal from the separation sensor 11 is turned off. The reader CPU 301 measures a time period during which the signal from the separation sensor 11 is on and calculates the product of the measured time period and the conveyance speed to obtain the length of the document.

Then, when the document is conveyed to the front surface reading position and read by the front surface reading unit 105, image data is generated based on the image of the document. The generated image data is transmitted to the reader image processing unit 304. The reader image processing unit 304 detects the edges of the document and measures the width of the document based on the detected edges. The reader image processing unit 304 identifies the document size based on the measured width of the document and the above-described length thereof and stores the image data having the identified document size in the reader image memory 305. The reader image processing unit 304 may read an image only in a region of the identified document size using the front surface read sensor 108 and the back surface read sensor 208. Alternatively, the reader image processing unit 304 may perform control in the following way. For example, the reader image processing unit 304 may read an image having the maximum size that can be read by the front surface read sensor 108 and the back surface read sensor 208, clip the image data corresponding to the region of the identified document size, and store the image data.

<About Document Setting Position on Document Tray>

The document tray 30 is coupled with the tray elevating motor 312 via gears. When the tray elevating motor 312 is driven, elevating operations such as lifting up and lowering operations of the document tray 30 is performed.

Figure 4:
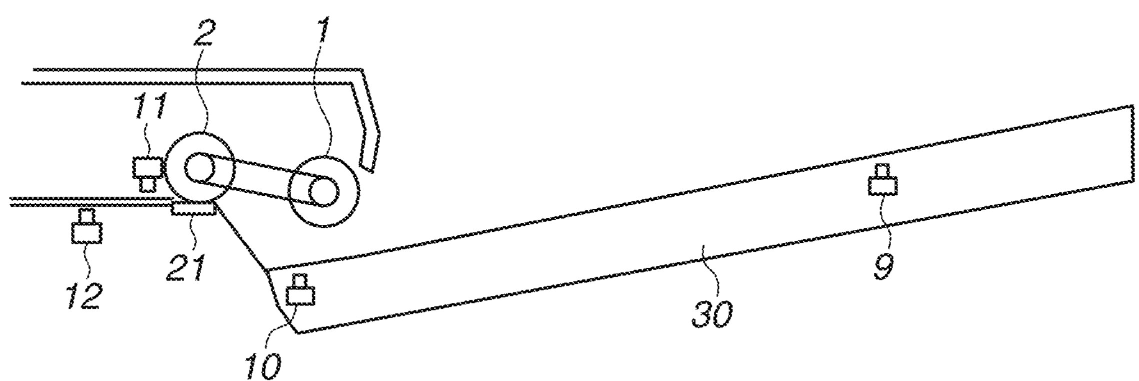
FIG. 4 is cross-sectional view illustrating a document tray in a lowered state according to the first exemplary embodiment.
Figure 5:
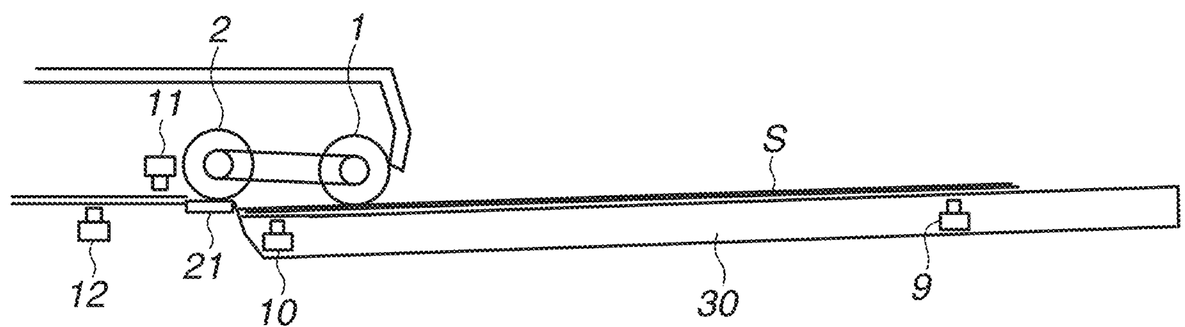
FIG. 5 is cross-sectional view illustrating the document tray in a lifted state according to the first exemplary embodiment.

When no document is placed on the document tray 30, the document tray 30 stands by in a lowered state as illustrated in FIG. 4. When the document bundle S is set on the document tray 30 and the document detection sensor 10 determines the presence of the documents, the reader CPU 301 lowers the feed roller 1 and lifts up the document tray 30 with the documents placed thereon, to feed the documents. Then, the reader CPU 301 stops lifting up the document tray 30 at the position where the feed roller 1 comes in contact with the document bundle S while the feed roller 1 is lowered. When the document tray 30 is lifted up and stopped, the document tray 30 is in the lifted state where the document bundle S is in contact with the feed roller 1, as illustrated in FIG. 5. This enables immediate driving of the feed roller 1 to feed the documents, thereby a time period from receiving a reading start instruction to feeding the first document can be reduced, and the document reading can be quickly started.

Figure 15A:
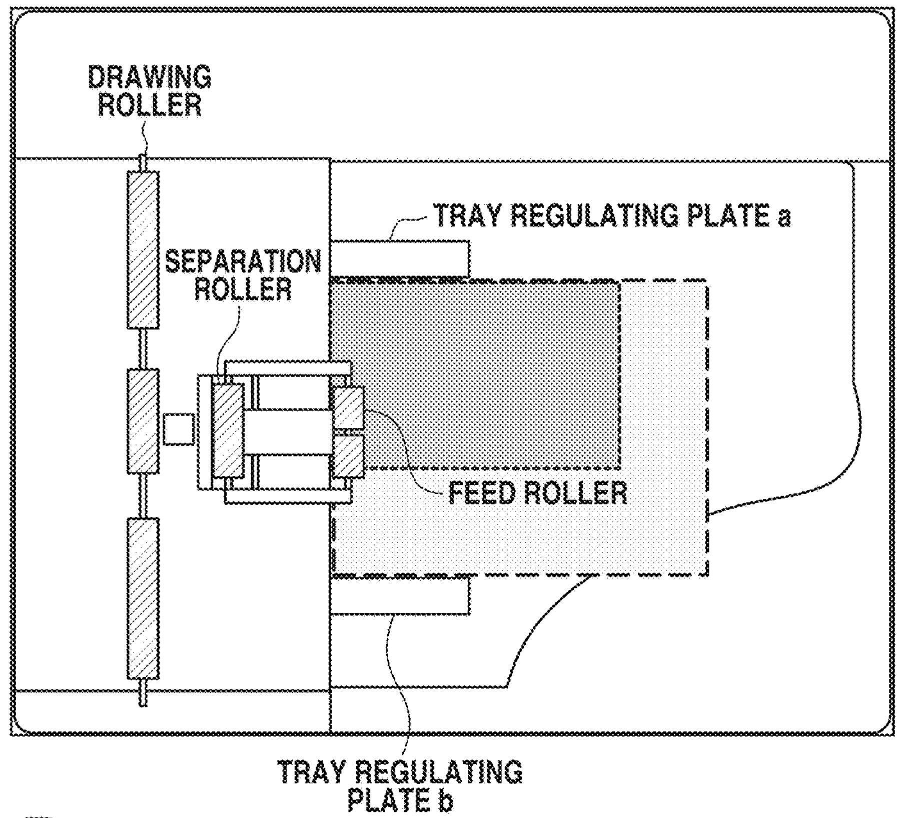
FIGS. 15A and 15B are diagrams each illustrating an automatic document reading unit when documents are set on the document tray while being abutted on guide plates, when viewed from the top.

As illustrated in FIG. 15A, the document tray 30 is provided with tray regulating plates a and b for setting the documents at the correct position (center position). The tray regulating plates a and b can be manually slid to fit the width of the document. By the on-tray width guide sensor 309 detecting a gap between the tray regulating plates a and b, the reader CPU 301 detects the width of the document. When reading only one document size, information on width size detected here is used.

In the case of mixed-documents, a plurality of documents of different sizes is to be placed on the document tray 30. In this case, to prevent the documents from being conveyed askew during the document feeding, the user places the documents on the document tray 30 so as to abut on the tray regulating plates a and b on the document tray 30, as illustrated in FIG. 15A. The placed documents are each conveyed by the feed roller 1 and then read.

Figure 15B:
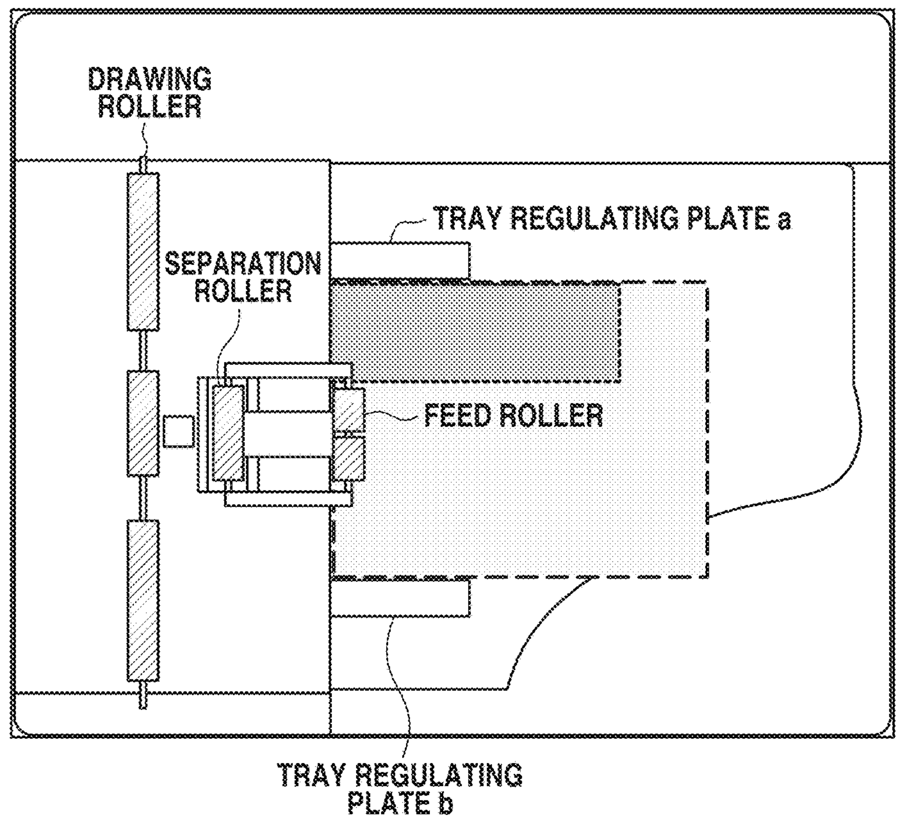

The above-described method is effective for document sizes standardized by International Organization for Standardization (ISO) 216 or Japanese Industrial Standards (JIS) P 0138, such as A3, A4, B4, and B5. However, if the above-described method is used to set documents when a non-standard document (e.g., receipts, checks, slips) is mixed to be read, the documents may not be set at the position of the feed roller 1 and cannot be fed by the feed roller 1, as illustrated in FIG. 15B.

Figure 16A:
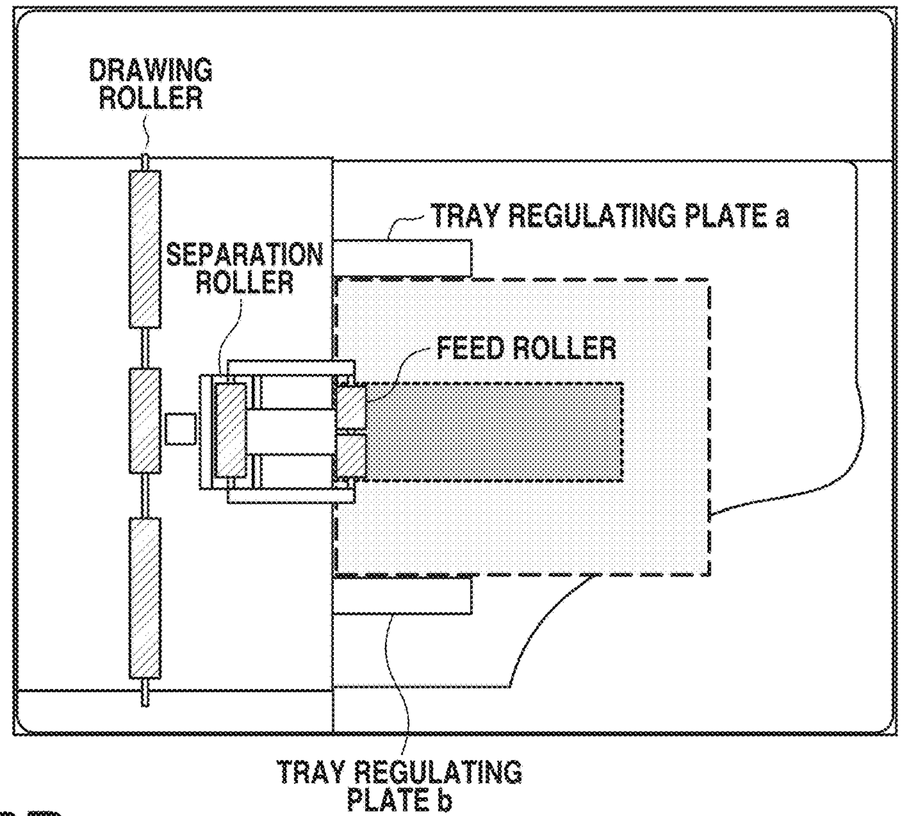
FIGS. 16A and 16B are diagrams each illustrating the automatic document reading unit when documents of non-standard size are placed on the document tray, when viewed from the top.

Thus, when the documents including the non-standard size document are placed, the reader CPU 301 needs to prompt the user to place the documents at the position of the feed roller 1 as illustrated in FIG. 16A.

Figure 16B:
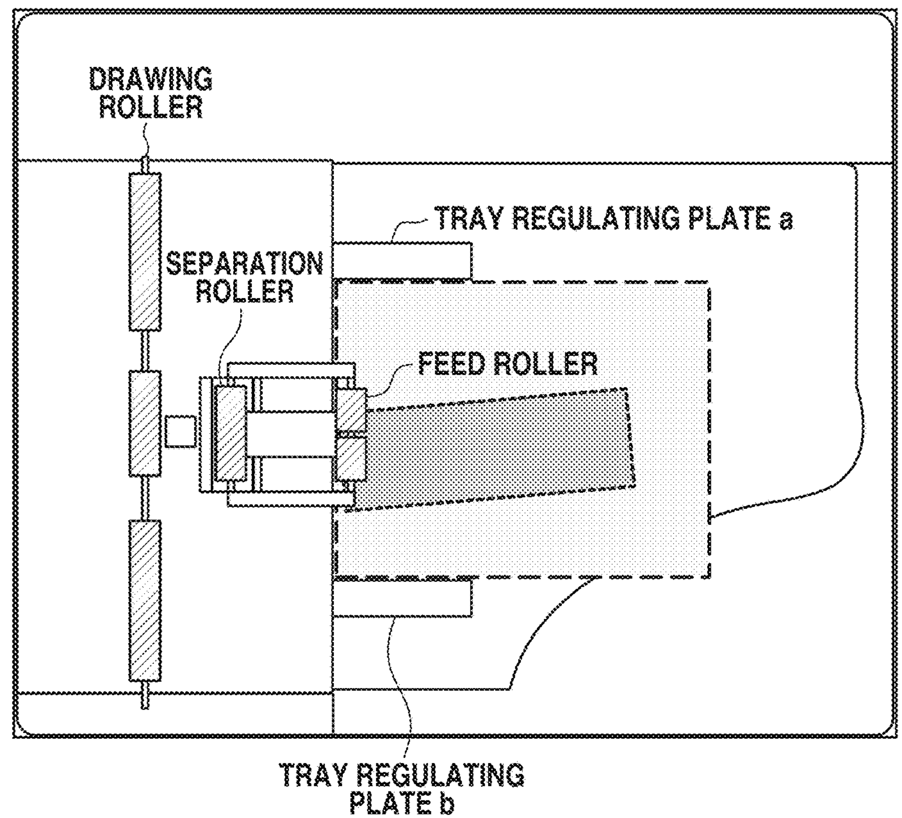

The document with a smaller size than other ones in the document bundle S cannot be placed to be abutting on the tray regulating plates a and b. Thus, the user is highly likely to place such a document once on the document tray 30 and then reset the document. For example, the user is highly likely to place documents once as illustrated in FIG. 16B and then reset the documents as illustrated in FIG. 16A.

Figure 17:
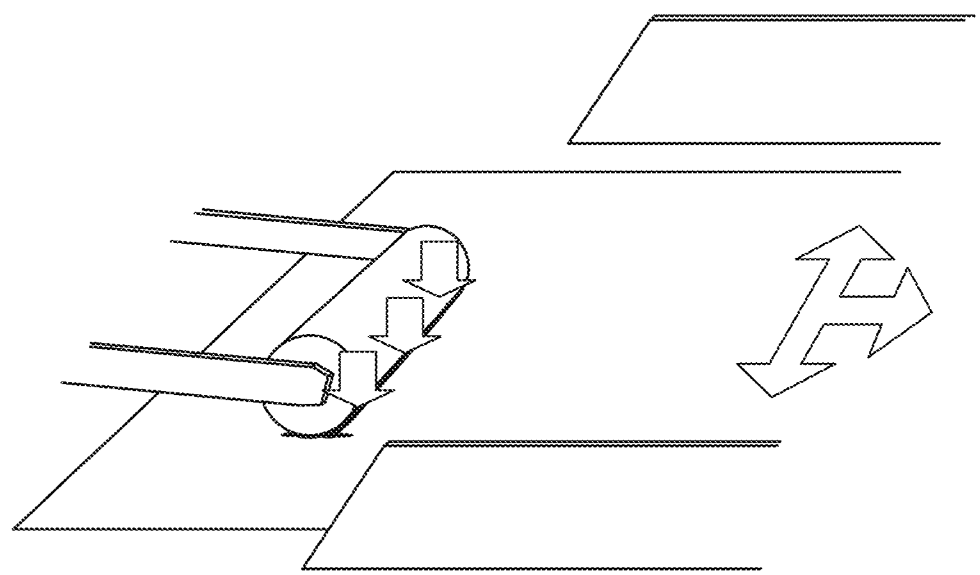
FIG. 17 is a perspective view illustrating the automatic document reading unit in a state where it is hard to reset documents.

At this time, when the document bundle S is set on the document tray 30 and the document tray 30 is lifted up and stopped, pressure is applied to the document bundle S by the feed roller 1, as illustrated in FIG. 17. In this state, the user can hardly correct the document position in a direction (main scanning direction) orthogonal to the document conveyance direction (sub scanning direction), and can hardly reset the documents.

It is desirable to change the lifting up and lowering of the document tray 30 depending on the application that performs the document reading and the read settings set by the user at the image reading. For example, when a form processing application is installed, it is desirable, from the viewpoint of convenience in the document placement, to lift up the document tray 30 not when the documents are placed but when the document reading is started. On the other hand, when a copy or an image transmission application is installed, priority is put on hassle-free placement of the document, and hence it is desirable to lift up the document tray 30 when documents are placed. To implement such operations, the elevating processing needs to be changed depending on the application characteristics and user settings.

Thus, in the present exemplary embodiment, whether to perform processing for lifting up the document tray 30 is determined upon detection of the documents depending on an active application.

<<Reading Mixed-Documents of Non-Standard Sizes>>>

Reading mixed-documents of non-standard sizes according to the present exemplary embodiment will be described below with reference to the accompanying drawings.

Figure 6:
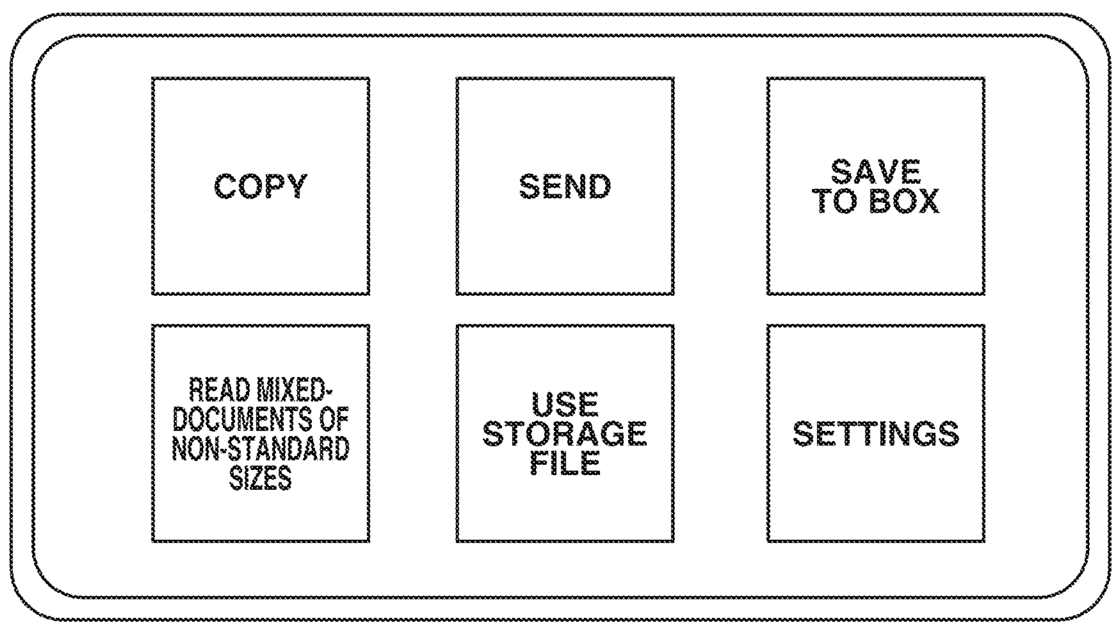
FIG. 6 is a diagram illustrating a function selection screen according to the first exemplary embodiment.

FIG. 6 illustrates a screen displayed on the operation unit 416 when a read operation is not performed after power of the image processing apparatus is turned on.

FIG. 6 illustrates a plurality of selectable buttons that can be selected when the user touches the screen via the touch panel.

When reading mixed-documents of non-standard sizes on the document tray 30, the user selects the “Read Mixed-Documents of Non-standard Sizes” button to enable reading of the mixed-documents of non-standard sizes.

When the “Read Mixed-Documents of Non-standard Sizes” button is selected, a screen for reading the mixed-documents of non-standard sizes (FIG. 7) is displayed. The screen prompts the user to place the documents at the center and enables the user to make desired read settings in details.

<<Selecting Document Tray Control Method for Each Application>>>

FIG. 8 illustrates example screens for setting, for each application, whether to automatically lift up or lower the document tray 30 when the documents are placed thereon.

The screen is displayed on the operation unit 416 by the system control application upon pressing of the "Settings" button in FIG. 6.

The user performs an operation on the operation unit 416 to change settings for each application. Settings for each application are stored in management table information in the RAM 413. The management table is saved in the HDD 412 in a situation where the RAM 413 is to be erased, such as when power of the image processing apparatus is turned off, and loaded into the RAM 413 when the power of the image processing apparatus is turned back on. FIG. 8 illustrates examples of setting screens 1000A, 1000C, and 1000E, and examples of management tables 1000B, 1000D, and 1000F in the RAM 413 when setting is made on respective setting screens.

Information in the management tables includes an application identifier (ID), an application name, and an automatic tray lifting setting. The application ID is a number uniquely assigned to each application. The application ID is issued individually for each application vendor or uniquely assigned to each application when the application is installed in the image processing apparatus. The application name indicates the name of each application, and is displayed in each application activation button in the screen in FIG. 6 to enable the user to visually recognize each application. The application name is also used as the name displayed in the screen 1000A when specifying an application subjected to a setting change.

The Copy application reads the image of a document to generate image data, and performs the Copy function of printing the image based on the generated image data on a printer unit 500. The Send application reads the image of a document to generate image data, and performs the Send function of transmitting the generated image data to a specified destination via a network I/F 417. The Save to Box application reads the image of a document to generate image data, and performs the Box function of saving the generated image data in the HDD 412. The Read Mixed-Documents of Non-standard Sizes application reads documents of non-standard sizes, such as receipts, checks, or slips, to generate image data, and performs the function of transmitting the generated image data to a specified destination via the network I/F 417.

Automatic Tray Lifting at Document Placement specifies whether to automatically lift up the document tray 30 when the documents are placed on the document tray 30. The default setting is indicated in the screen 1000A and a row 1002 of Table 1000B, and only the Read Mixed-Documents of Non-standard Sizes application in a row 1001 of the screen 1000A is highlighted. The setting means that the document tray 30 is not to be automatically lifted up when documents are placed. If the user wants to make a setting to not automatically lift up the document tray 30 for the Send application (application that reads a document and sends image data of the document to a specified destination), the user performs the following operation. First, the user presses a row 1003 of the screen 1000C to highlight the row 1003 and then presses an OK key 1004. After the OK key 1004 is pressed, the system control application changes the management table, i.e., the system control application changes the Automatic Tray Lifting at Document Placement setting for the Send function to 0.

When a new application (for example, the form processing application) is installed, a new settable application is added as in the screen 1000E at any time, and the application is also added to the management table. The default setting of the Automatic Tray Lifting at Document Placement setting (1 or 0) in the management table may be determined for each application. The system control application of the image processing apparatus may automatically determine the application and register the initial value of the Automatic Tray Lifting at Document Placement setting.

Figure 9:
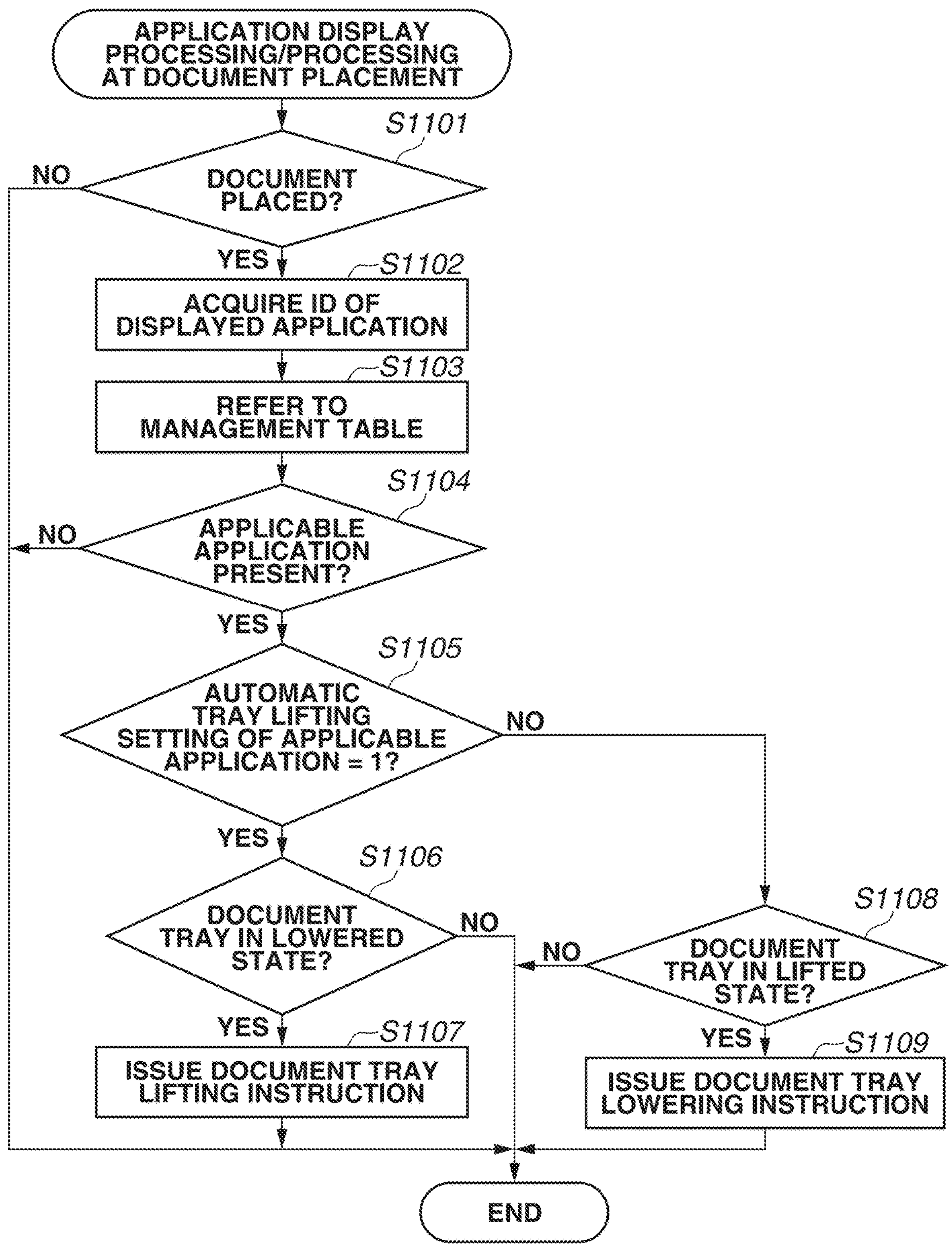
FIG. 9 is a flowchart illustrating processing performed by the image processing apparatus according to the first exemplary embodiment.

The operation to be performed when an application is selected and the documents are placed will be described below with reference to the flowchart in FIG. 9. The flowchart is implemented when the system CPU 411 (hereinafter referred to as the CPU 411) loads the system control application from the HDD 412 into the RAM 413 and then executes the application.

While detailed descriptions will be omitted, the system CPU 411 of the system controller 400 lifts up and lowers the document tray 30 by issuing control instructions to the reader CPU 301 of the reader controller 300. The reader controller 300 notifies the system controller 400 of the lifted or lowered state after the state transition. The flowchart is executed when the documents are placed on the document tray 30 or when an application is selected on the screen in FIG. 6. Of course, when the documents are removed from the document tray 30, the system CPU 411 unconditionally issues a document tray lowering instruction. The processing for lowering the document tray 30 when the documents are removed from the document tray 30 may be performed by the reader controller 300 alone.

Figure 7:
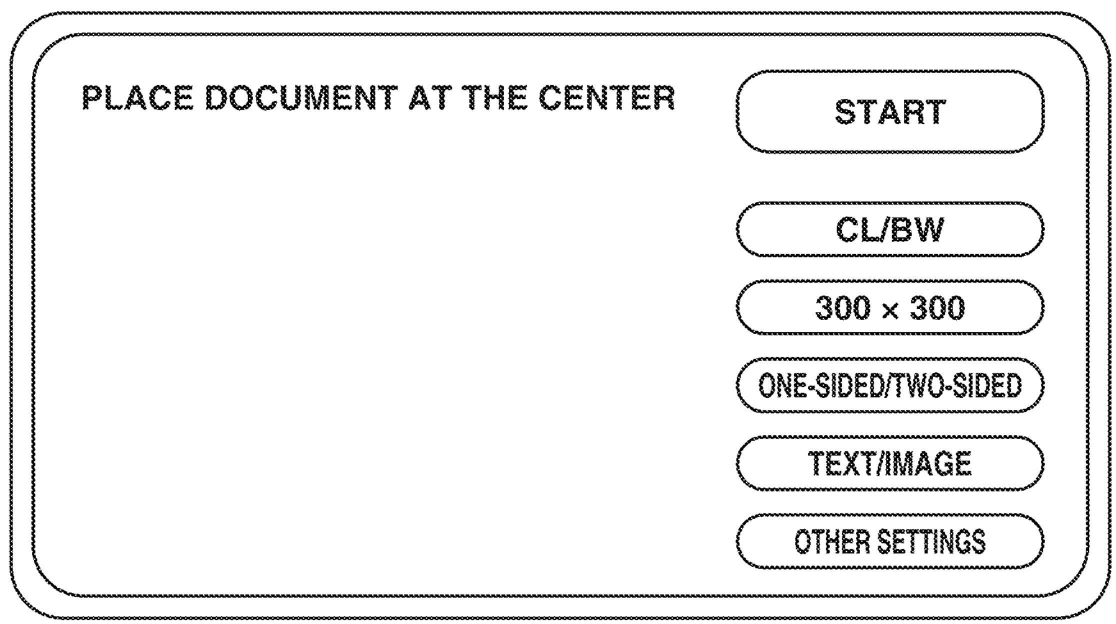
FIG. 7 is a diagram illustrating a screen of a function for reading mixed-documents of non-standard sizes according to the first exemplary embodiment.

In step S1101, the CPU 411 checks whether the documents are placed. More specifically, the CPU 411 determines whether to lift up the document tray 30 upon placement of the documents. When no document is placed on the document tray 30, the lifting up of the document tray 30 is not required, and hence the processing once exits the flowchart in FIG. 9. Then, the system CPU 411 continues the determination in step S1101. When the documents are placed (YES in step S1101), the processing proceeds to step S1102. In step S1102, the CPU 411 acquires the ID of the application corresponding to the displayed screen. For example, when the Copy button in FIG. 6 is selected and the Copy application is active, i.e., the Copy screen is displayed, the system CPU 411 acquires 1 as the application ID. When the Read Mixed-Documents of Non-standard Sizes button is selected and the Read Mixed-Documents of Non-standard Sizes application is active, i.e., the Read Mixed-Documents of Non-standard Sizes screen in FIG. 7 is displayed, the system CPU 411 acquires 4 as the application ID. In step S1102, the CPU 411 may simply acquire the ID of the active application instead of identifying the application corresponding to the displayed screen based on the displayed screen and then acquiring the ID of the application.

After acquiring the application ID, in step S1103, the CPU 411 refers to the management table loaded in the RAM 413. If the application ID acquired in step S1102 is registered in the management table, in step S104, the CPU 411 determines that the applicable application is present (YES in step S1104). On the other hand, if the screen in FIG. 6 remains displayed and no application is selected, in step S104, the CPU 411 determines that no applicable application is present (NO in step S1104), and the processing exits the flowchart in FIG. 9.

When CPU 411 determines that the applicable application is present (YES in step S1104), the CPU 411 confirms the numerical value of the Automatic Tray Lifting at Document Placement setting for each individual application in the management table. If the numerical value is 1 (YES in step S1105), the processing proceeds to step S1106. If the numerical value is 0 (NO in step S1105), the processing proceeds to step S1108.

In step S1106, the CPU 411 determines whether the document tray 30 is in the lowered state. If the document tray 30 is in the lowered state (YES in step S1106), the processing proceeds to step S1107. If the document tray 30 is not in the lowered state (NO in step S1106), the processing exits the flowchart in FIG. 9.

In step S1107, the CPU 411 issues a document tray lifting instruction to the reader controller 300 to lift up the document tray 30. Then, the processing exits the flowchart in FIG. 9.

If the CPU 411 determines that the document tray 30 is not in the lowered state (NO in step S1106), the CPU 411 assumes that the document tray 30 is already in the lifted state and leaves the state of the document tray 30 unchanged. Then, the processing exits the flowchart.

If the numerical value of the Automatic Tray Lifting at Document Placement setting is 0 (NO in step S1105), i.e., if the document tray 30 is not to be lifted up when the documents are placed, the processing proceeds to step S1108.

In step S1108, the CPU 411 determines whether the document tray 30 is in the lifted state. If the CPU 411 determines that the document tray 30 is in the lifted state (YES in step S1108), the processing proceeds to step S1109. In step S1109, the CPU 411 issues a document tray lowering instruction to the reader controller 300. If the CPU 411 determines that the document tray 30 is not in the lifted state (NO in step S1108), the CPU 411 leaves the state of the document tray 30 unchanged. Then, the processing exits the flowchart in FIG. 9.

If the CPU 411 receives a reading start instruction when the document tray 30 is in the lowered state, the CPU 411 automatically lifts up the document tray 30, and then conveys and reads the documents.

The above-described control enables the CPU 411 to set, for each application, whether to automatically lift up the document tray 30 upon placement of the documents on the document tray 30. Thus, the lifting control of the document tray 30 can be appropriately performed by changing the setting about whether to automatically lift up the document tray 30 between the Read Mixed-Documents of Non-standard Sizes application that is likely to read the documents of non-standard sizes and the application for reading the documents of a standard size.

The first exemplary embodiment has been described above centering on an example where the setting about whether to automatically lift up the document tray 30 upon placement of the documents is provided for each application.

A second exemplary embodiment will be described below centering on an example where the setting about whether to automatically lift up the document tray 30 upon placement of the documents is determined depending on the registered contents for the reading mode.

The default reading mode specification for each application will be described in detail below with reference to FIG. 10. Screens 1200A and 1200C are examples of a setting screen for determining a default value for the reading mode for each application. As initial values, the reading mode for reading documents of a standard size is registered as the default value for three applications, namely, the Copy application, Send application, and Save to Box application. For the Read Mixed-Documents of Non-standard Sizes application, the mixed-documents reading can be registered as the default value. The default values are pre-stored as prescribed values for the applications by the system control application. Instead of being stored by the system control application, the default values may be stored and notified to the system control application by each application.

To change the settings, the user presses a setting key for each application on the screen 1200A.

To change the default value for the Send reading mode, the user presses a key 1201 and then presses an OK key 1202. When the OK key 1202 is pressed, a management table 1200D is generated in the RAM 413.

Figure 10:
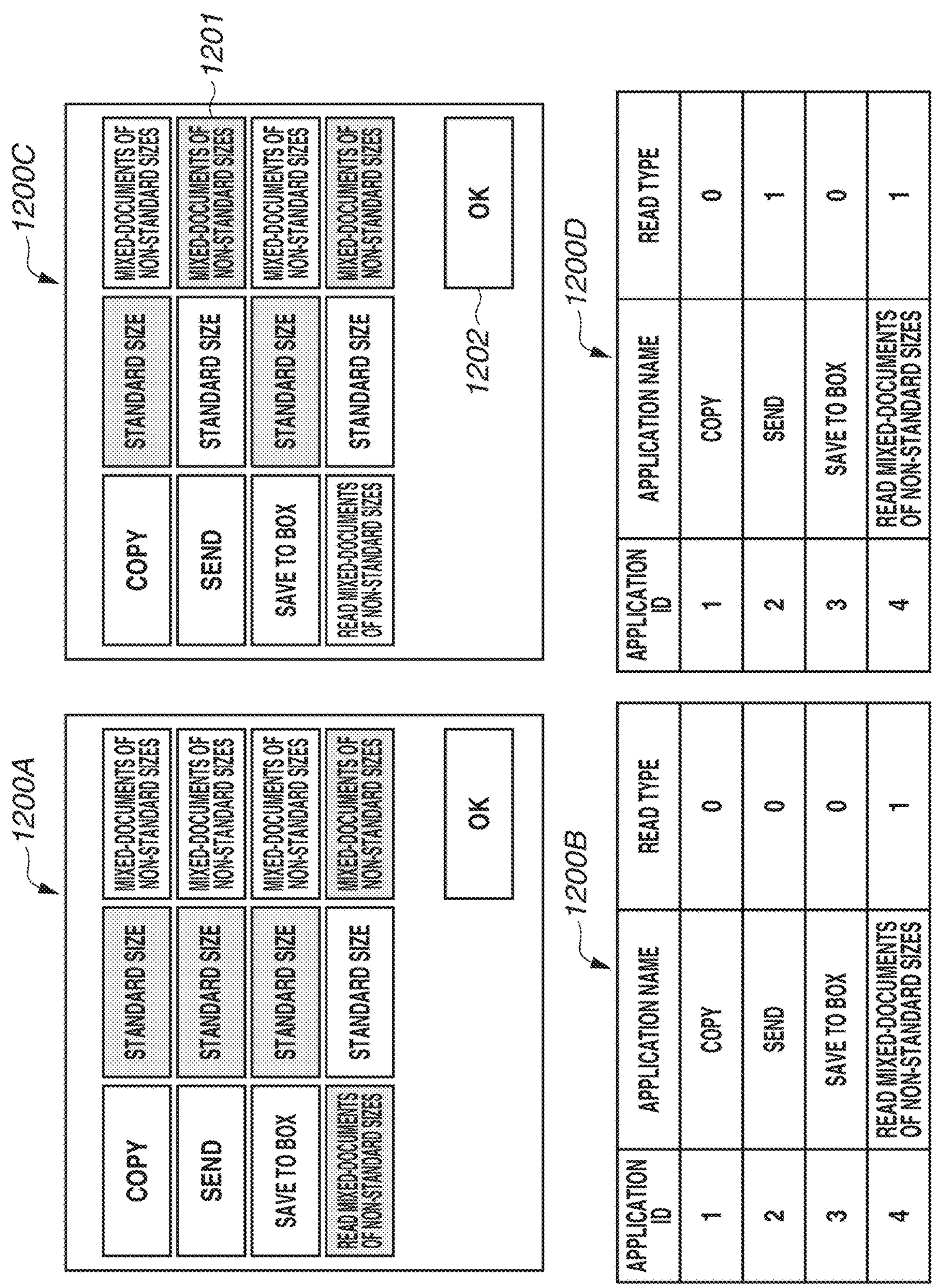
FIG. 10 is a diagram illustrating a reading mode setting screen for each application according to a second exemplary embodiment.
Figure 11:
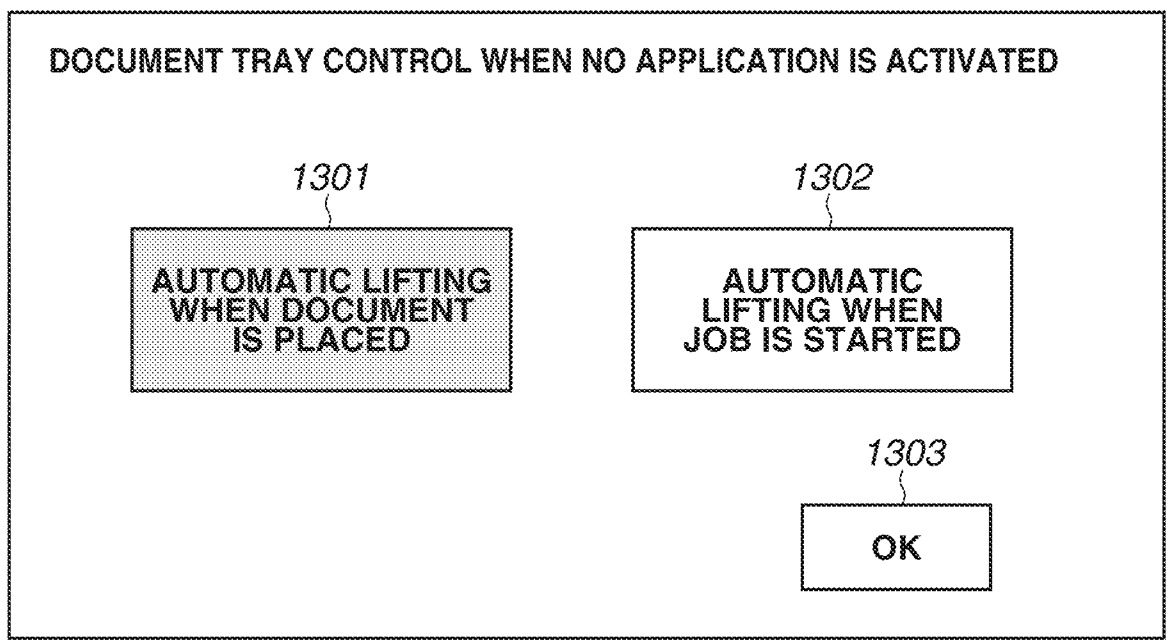
FIG. 11 is a diagram illustrating a setting screen for selecting an operation to be performed when no application is activated according to the second exemplary embodiment.

FIG. 11 illustrates a screen for setting a default operation to be performed when no application is selected. While FIG. 10 illustrates a screen for determining a behavior when each application is displayed, FIG. 11 illustrates a screen for making a setting when the documents are placed on the document tray 30 in a state where no application is selected.

An Automatic Lifting When Document Is Placed key 1301 is used to unconditionally lift up the document tray 30 when the documents are placed. An Automatic Lifting When Job Is Started key 1302 is used to lift up the document tray 30 when the document reading is started. The Automatic Lifting When Document Is Placed key 1301 and the Automatic Lifting When Job Is Started key 1302 are exclusively selected, and the selected key is highlighted. When an OK key 1303 is pressed after making the setting, the setting value is stored in the RAM 413.

Figure 12:
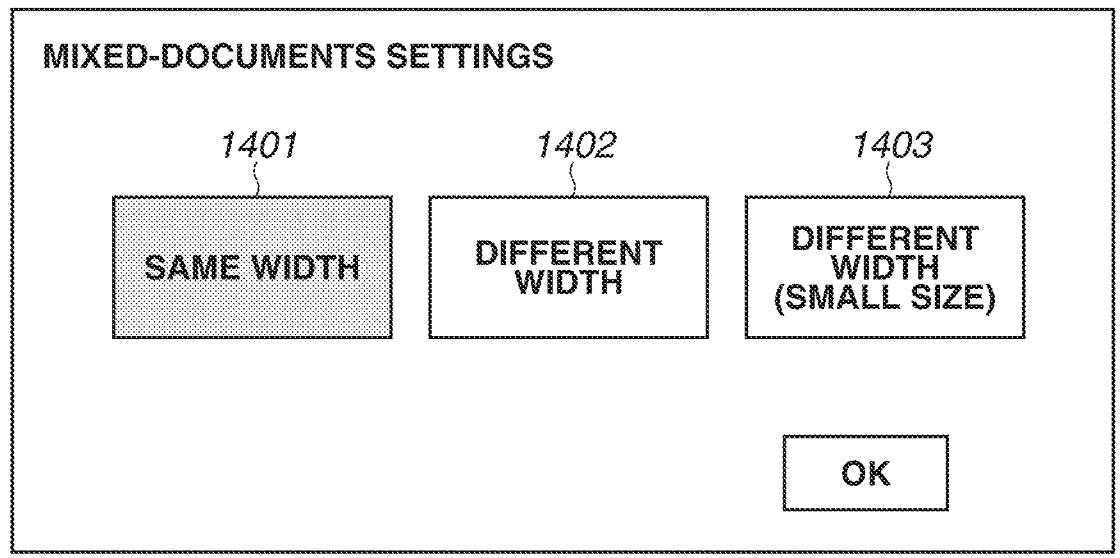
FIG. 12 is a diagram illustrating a setting screen for setting a mixed-documents setting mode for each job according to the second exemplary embodiment.

The initial value of the operation setting when no application is selected is initialized with the value pre-stored by the system control application and can be freely changed by the user. FIG. 12 illustrates an example screen for selecting a mixed-documents mode in each reading mode. A Same Width key 1401 is used to issue an instruction for setting mixed documents in the same series. A Different Width key 1402 is used to issue an instruction for setting mixed documents in different series. A Different Width (Small Size) key 1403 is used to issue an instruction for reading mixed documents of non-standard sizes. These setting values are stored in the RAM 413 when an OK key is pressed.

When the Mixed-Documents of Non-standard Sizes setting is made in the reading mode setting of each application in FIG. 10, the screen in FIG. 12 is displayed in a state where the Different Width (Small Size) key 1403 is selected.

Figure 13:
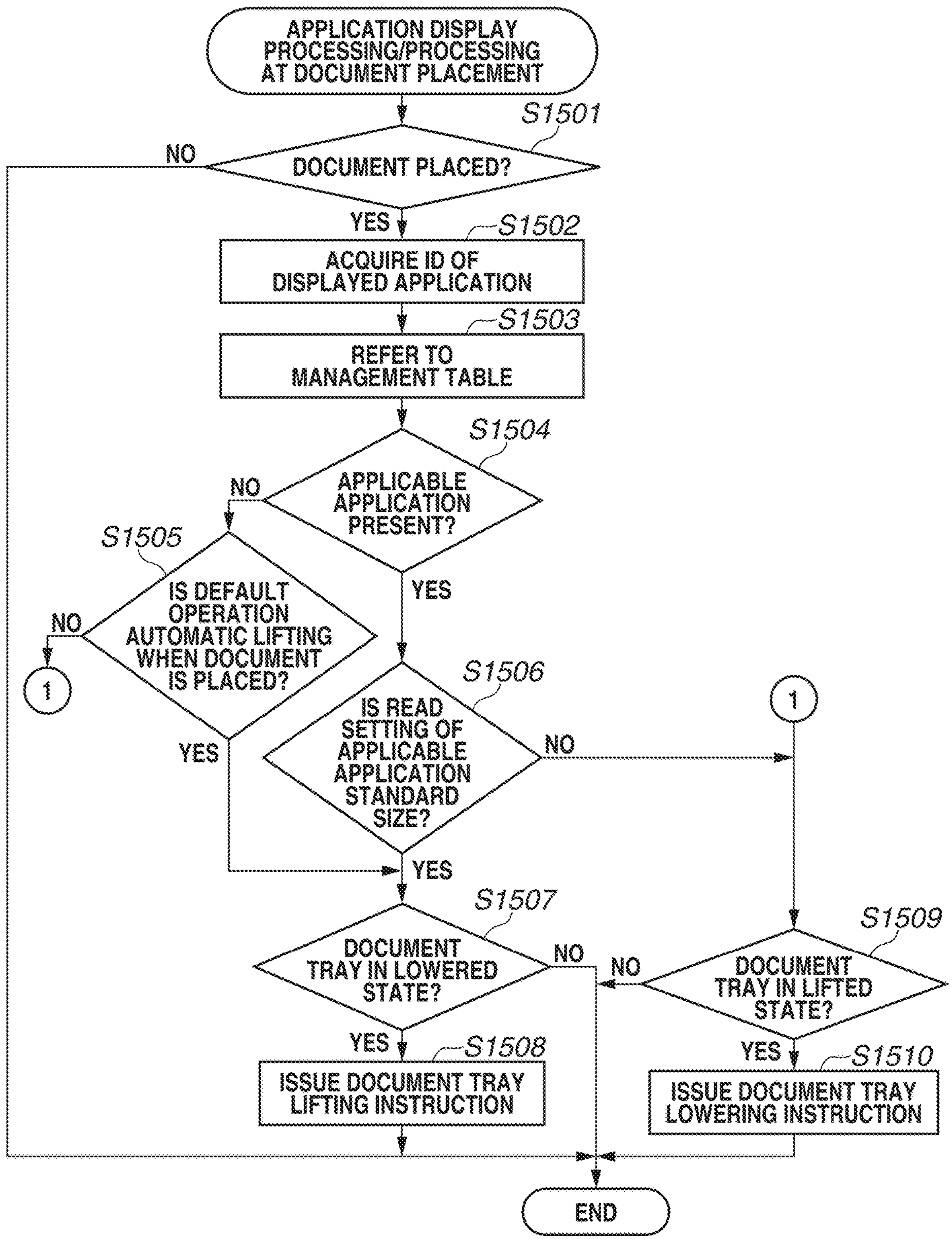
FIG. 13 is a flowchart illustrating processing performed by the image processing apparatus according to the second exemplary embodiment.

The operation to be performed when the documents are placed or when an application is selected will be described below with reference to the flowchart in FIG. 13. The basic operation is similar to that of the flowchart in FIG. 9. The flowchart is implemented by the system CPU 411 (hereinafter referred to as the CPU 411) loading the system control application from the HDD 412 into the RAM 413.

In step S1501, the CPU 411 determines whether the documents are placed. When no document is placed (NO in step S1501), the processing exits the flowchart in FIG. 13. Then, the CPU 411 continues the determination in step S1501. If the CPU 411 determines that the documents are placed (YES in step S1501), the processing proceeds to step S1502.

In step S1502, the CPU 411 acquires the ID of the displayed application. In step S1503, the CPU 411 refers to the management table. If the CPU 411 determines that the ID of the displayed application is not registered as a result of referring to the management table (NO in step S1504), the processing proceeds to step S1505.

In step S1505, the CPU 411 reads the setting value of document tray control when no application is activated, preset in the screen in FIG. 11, from a region of the RAM 413. When the default operation setting is the Automatic Lifting When Document Is Placed setting (YES in step S1505), the processing proceeds to step S1507. In step S1507, the CPU 411 determines whether the document tray 30 is in the lowered state. If the CPU 411 determines that the document tray 30 is in the lowered state (YES in step S1507), the processing proceeds to step S1508 to issue a document tray lifting instruction. On the other hand, if the CPU 411 determines that the document tray 30 is not in the lowered state (NO in step S1507), the processing exits the flowchart in FIG. 13. In step S1508, the CPU 411 issues the document tray lifting instruction.

If the CPU 411 determines that the default operation setting is the Automatic Lifting When Job Is Started setting (NO in step S1505), the processing proceeds to step S1509.

In step S1509, the CPU 411 determines whether the document tray 30 is in the lifted state. If the CPU 411 determines that the document tray 30 is in the lifted state (YES in step S1509), the processing proceeds to step S1510. In step S1510, the CPU 411 issues a document tray lowering instruction.

If the CPU 411 determines that the ID of the displayed application is registered in the management table (YES in step S1504), the processing proceeds to step S1506.

In step S1506, the CPU 411 determines whether the default value setting of the reading mode registered in the management table is Standard Size. If the CPU 411 determines that the default value setting is Standard Size (YES in step S1506), the processing proceeds to step S1507. On the other hand, if the CPU 411 determines that the default value setting is Mixed-Documents of Non-standard Sizes (NO in step S1506), the processing proceeds to step S1509.

Performing the above-described control enables optimally controlling the lifting and lowering of the document tray 30 when an application to be used is selected and when the documents are placed. An operation to be performed when the mixed-documents read setting is changed after the selection of an application will be described in detail below with reference to FIG. 14. The flowchart is implemented by the CPU 411 loading the system control application from the HDD 412 into the RAM 413.

Figure 14:
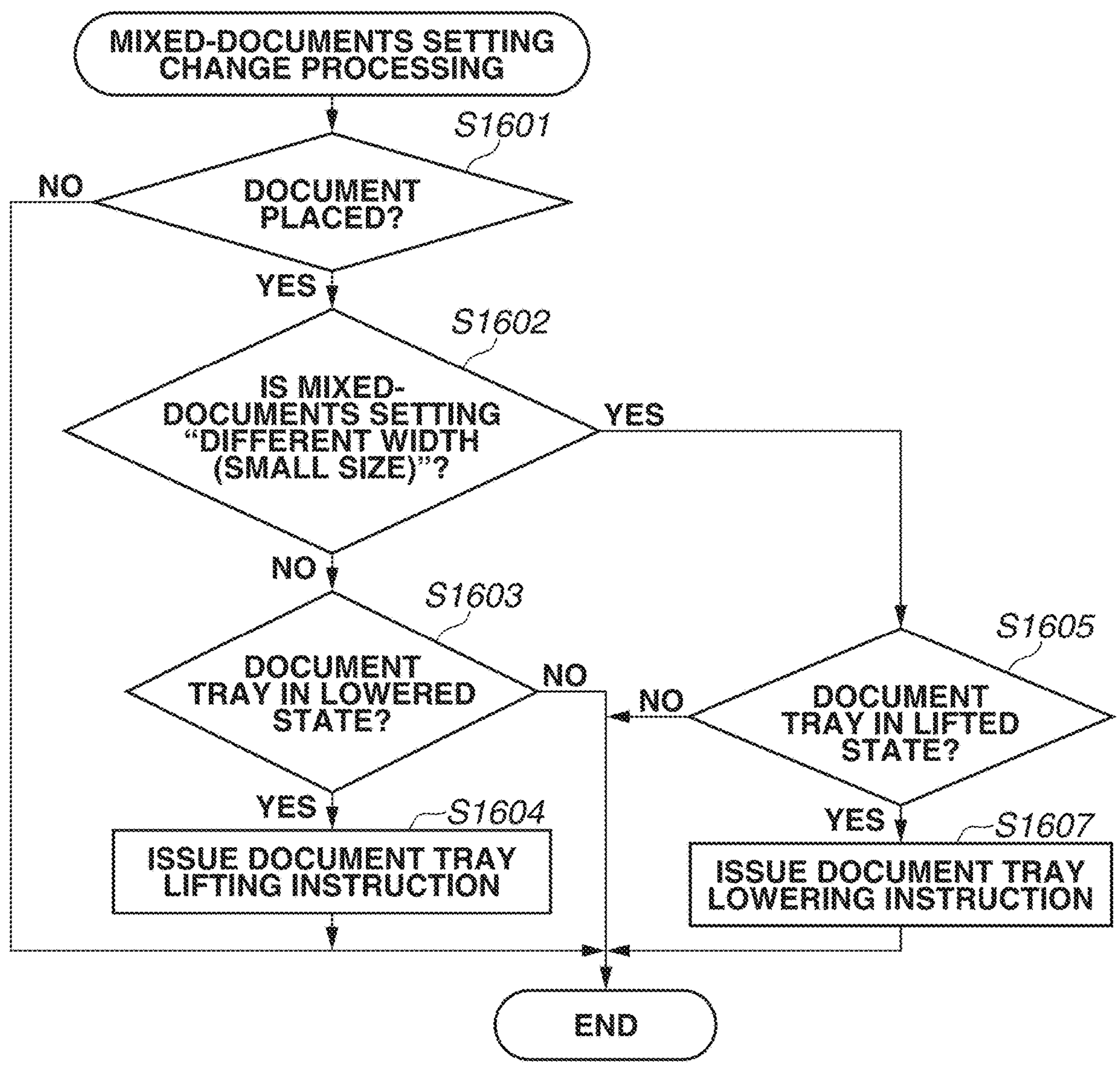
FIG. 14 is another flowchart illustrating processing performed by the image processing apparatus according to the second exemplary embodiment.

The flowchart is performed when the user selects an application and then changes the job setting at any timing (i.e., when the user presses the OK key in FIG. 12). Thus, the flowchart in FIG. 14 is performed after execution of the flowchart in FIG. 13. The flowchart in FIG. 14 is performed each time a setting is changed. Changing the document tray 30 to be in the lowered state when the documents are removed will not be described in detail on the premise that the document tray 30 is kept in the lowered state.

In step S1601, the CPU 411 checks whether the documents are placed. When no document is placed (NO in step S1601), the processing exits the flowchart. When the documents are placed (YES in step S1601), the processing proceeds to step S1602. In step S1602, the CPU 411 checks the setting of the mixed-documents mode on the screen in FIG. 12. The setting value of the mixed-documents mode is stored in the RAM 413 when the OK key is pressed on the screen in FIG. 12. The CPU 411 reads and checks the information. If Different Width (Small Size) is selected (YES in step S1602), the processing proceeds to step S1605. If other settings are selected (NO in step S1602), the processing proceeds to step S1603. Processing in steps S1603, S1604, S1605, and S1607 is similar to the processing in steps S1106, S1107, S1108, and S1109, respectively, and thus detailed descriptions thereof will be omitted.

The above-described control makes it possible to change whether to automatically lift up the document tray 30 upon detection of the documents based on the default mode registered for each application. In a case where receipts, checks, slips, or other documents of non-standard sizes are highly likely to be placed, the above-described control makes it easier for the user to reset the documents, thus improving the user's convenience.

In the above-described exemplary embodiments, the examples have been described where the image processing apparatus includes a plurality of applications, and stores, in association with each application, the setting about whether to lift up the document tray 30 upon detection of the document placement. However, the present invention is not limited thereto. It is also possible to store, in association with each application, the setting about whether to lift up the document tray 30 upon detection of the document placement during execution of the application. For example, in a case where a new application is installed in the image processing apparatus, it is also possible to prompt the user to select, in association with the application, whether to lift up the document tray 30 upon detection of the document placement, and store the result of the selection.

While, in the above-described exemplary embodiments, Copy, Send, Save to Box, Read Mixed-Documents of Non-standard Sizes are referred to as applications, these applications do not need to be installed in a form of an application but may be provided as original functions.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-153843, filed Sep. 14, 2020, which is hereby incorporated by reference herein in its entirety.

What is claimed is:

1. An image processing apparatus comprising:

a document tray;

a lifter configured to lift up the document tray upon placement of a document on the document tray;

a conveyor that conveys the document placed on the document tray lifted up by the lifter; and a reader that reads the document conveyed by the conveyor, wherein the image processing apparatus registers, for an application, whether to lift up the document tray upon the placement of the document on the document tray.

2. The image processing apparatus according to claim 1, wherein, during execution of a first application for which the image processing apparatus has registered to lift up the document tray upon the placement of the document on the document tray, the document tray is lifted up upon the placement of the document on the document tray, and wherein, during execution of a second application for which the image processing apparatus has registered not to lift up the document tray upon the placement of the document on the document tray, the document tray is not lifted up upon the placement of the document on the document tray.

3. The image processing apparatus according to claim 2, wherein the first application is a copy application.

4. The image processing apparatus according to claim 2, wherein the second application is a form processing application.

5. The image processing apparatus according to claim 1, wherein, during display of a screen of a first application for which the image processing apparatus has registered to lift up the document tray upon the placement of the document on the document tray, the document tray is lifted up upon the placement of the document on the document tray, and wherein, during display of a screen of a second application for which the image processing apparatus has registered not to lift up the document tray upon the placement of the document on the document tray, the document tray is not lifted up upon the placement of the document on the document tray.

6. The image processing apparatus according to claim 1, wherein the image processing apparatus is configured to install a new application, and wherein, for the new application installed by the image processing apparatus, the image processing apparatus can register whether to lift up the document tray upon the placement of the document on the document tray.

7. A method for controlling an image processing apparatus configured to lift up a document tray upon placement of a document on the documents tray, the method comprising:

conveying the document placed on the document tray which is lifted up;

reading the document conveyed in the conveying; and registering, for an application, whether to lift up the document tray upon the placement of the document on the document tray.

8. A non-transitory computer-readable storage medium storing a program for causing a computer to execute a method for controlling an image processing apparatus configured to lift up a document tray upon placement of a document on the documents tray, the method comprising:

conveying the document placed on the document tray which is lifted up;

reading the document conveyed in the conveying; and registering, for an application, whether to lift up the document tray upon the placement of the document on the document tray.

9. An image processing apparatus comprising:

a document tray;

a display;

a lifter configured to lift up the document tray upon placement of a document on the document tray;

a conveyor that conveys the document placed on the document tray lifted up by the lifter;

a reader that reads the document conveyed by the conveyor; and a controller that causes the lifter to lift up the document tray upon placement of the document on the document tray in a case where the display displays a first screen of a first predetermined application, wherein the controller does not cause the lifter to lift up the document tray upon placement of the document on the document tray in a case where the display displays a second screen of a second predetermined application.

10. The image processing apparatus according to claim 9, wherein the first predetermined application is a copy application.

11. The image processing apparatus according to claim 9, wherein the second predetermined application is a form processing application.

* * * * *